US008337741B2

(12) United States Patent
Romer et al.

(10) Patent No.: US 8,337,741 B2
(45) Date of Patent: Dec. 25, 2012

(54) METHOD FOR OPERATING A ROTARY PRESS AND CONCENTRICALLY RUNNING PRESS

(75) Inventors: Harald Romer, Reinbek (DE); Ulrich Zeuschner, Schwarzenbek (DE); Ingo Schmidt, Schwarzenbek (DE); Thorsten Ehrich, Witzhave (DE); Kurt Marquardt, Hamburg (DE)

(73) Assignee: Fette GmbH, Schwarzenbek (DE)

( * ) Notice: Subject to any disclaimer, the term of this patent is extended or adjusted under 35 U.S.C. 154(b) by 592 days.

(21) Appl. No.: 11/411,278

(22) Filed: Apr. 25, 2006

(65) Prior Publication Data

US 2006/0255506 A1 Nov. 16, 2006

(30) Foreign Application Priority Data

May 12, 2005 (DE) ........................ 10 2005 021 923

(51) Int. Cl.
*B29C 59/02* (2006.01)

(52) U.S. Cl. ............ 264/320; 264/2.1; 264/8; 264/45.7; 264/538; 264/543; 264/209.2; 264/663; 264/109; 264/297.1; 264/299; 264/310; 264/334; 264/336; 425/451; 425/406; 425/165; 425/167; 425/540; 425/402; 425/177; 425/193; 425/149; 425/157; 425/353; 425/355; 425/451.4

(58) Field of Classification Search ................. 264/320, 264/8, 538, 663, 543, 109, 123, 125, 297.1, 264/297.6, 299, 310, 334, 336, 2.1, 45.7, 264/209.2; 425/540, 402, 451, 451.4, 517, 425/520, 406, 177, 193, 353–355, 149, 157, 425/165, 167, 236, 347, 350, 351, 422, 444
See application file for complete search history.

(56) References Cited

U.S. PATENT DOCUMENTS 1,803,814 A * 5/1931 Spengler et al. ............. 264/120
(Continued)

FOREIGN PATENT DOCUMENTS

DE 2 029 094 12/1970
(Continued)

OTHER PUBLICATIONS

PAJ: Patent Abstract of Japan. CD-ROM. 2003 JP 2003071600 A.

*Primary Examiner* — Jeffrey Wollschlager
*Assistant Examiner* — Stella Yi
(74) *Attorney, Agent, or Firm* — Vidas, Arrett & Steinkraus, P.A.

(57) ABSTRACT

A method for operating a rotary press, comprising a rotor rotatably driven about a vertical axis that has a die-plate and upper and lower rams which, while being guided vertically in guides of the rotor, interact with holes of dies in the die-plate wherein at least one compression station is provided and has an upper and a lower pressing roller past which the presser rams run along and by which they are moved towards the die-bore for the purpose of compacting the material in the die-hole, wherein the upper and lower rams are lifted subsequent to the compression procedure, causing the lower ram to eject a compact from the die and the compact to be stripped by a stripper in the direction of a discharge chute, characterized in that while an compact ejection procedure is under way the upper ram stands upright on top of the compact and is lifted therewith and the stripper seizes the compact laterally while the upper ram is still standing upright on top of the compact.

3 Claims, 2 Drawing Sheets

U.S. PATENT DOCUMENTS 3,483,831 A * 12/1969 Funakoshi et al. ............ 425/345
5,350,548 A * 9/1994 Hinzpeter et al. ........... 264/40.4

FOREIGN PATENT DOCUMENTS

DE 8 816 064 4/1989
DE 195 12 655 A1 1/1996
DE 1 002 4340 11/2000
DE 100 58 934 A1 6/2002
EP 0 448 190 9/1991
GB 311070 4/1928

* cited by examiner

METHOD FOR OPERATING A ROTARY PRESS AND CONCENTRICALLY RUNNING PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known to employ rotary presses for the manufacture of tablets and similar compacts. The presses have a rotor which is rotatably supported and driven about a vertical axis wherein the rotor that has a die-plate and ram guides for upper and lower rams. Those upper and lower rams are guided by appropriate control cams and at least one compression station has disposed therein an upper and a lower pressing roller or compression roller by means of which the compression rams compact the material to be compressed which is inside the dies.

Some materials to be compacted tend to adhere to the pressing surface of the upper rams after the compression procedure when the upper ram starts its return travel. The result of this effect is that the surface of the compact is not of the quality desired and, moreover, has an adverse impact on the succeeding compressing procedure. It has become known from EP 0 448 190 B1 or DE 88 16 064 U1 to mount the rams rotatably in the ram guides and set them into rotation during the return travel after a compression procedure. Rotating the rams helps eliminate the adhesion effect to a large extent. It has been known from DE 100 24 340 C2 to mount a ram insert rotatably within the ram shank, the insert having a lug which is guided in a helical line between two axially spaced lugs. The insert is loaded by a spring away from the ram shank in a downward direction.

During the return travel of the upper rams, a relief of the load takes place during which the upper ram normally is within the die. If the compact is not circular, e.g. is square-shaped, a rotation of the compression rams or inserts will not be performed.

It is the object of the invention to provide a method for operating a rotary press which makes it possible to remove the compacts with no compact material sticking thereto regardless of the cross-sectional shape of the dies.

BRIEF SUMMARY OF THE INVENTION

In the method of the invention, the upper ram will rest on the compact as before because of its own weight while the compact is ejected from the die by means of the lower ram. Once the compact is just above the upper edge of the die it may be stripped by a stripper with the upper ram continuing to stand on top of the compact at least for a while during this procedure. It is understood that the upper ram needs to be seized by a cam portion of the upper control cam before the stripper has pushed the compact completely away between the rams because the upper ram otherwise would bring its pressing surface into engagement with the stripper, which naturally has to be avoided.

A rotary press of the invention provides control cams, but the upper rams are not guided in height in the sense of rotation of the rotor behind the compression station, which causes the upper rams to be "pre-loaded" downwardly by their own weights in this area. Therefore, the rams are allowed to continue standing on top of the compact and load it by their weights. Pushing the compact away between the pressing surfaces is performed over a certain distance, at least 0.5 mm, before the upper ram will then be lifted off.

For the above reasons, it is understood that the stripper is of a thickness which is smaller than the thickness of the compact. It is preferred for the stripper to engage the compact at a roughly central point between the pressing surfaces in order to strip the compact.

According to an aspect of the invention, it is beneficial for a cam portion of the lower guide cam of the lower ram to extend horizontally during stripping, which lifts the compact no more than up to a minimum above the upper side of the die-plate.

The advantages of the inventive method and inventive rotary press are as follows: The stripping procedure with a load applied by the upper ram prevents compact materials from adhering to the pressing surfaces of the rams. This ensures continuous production. Cleaning processes become unnecessary on the pressing surfaces of the rams. The mechanical provisions made on the rotary press for the implementation of the inventive method are extremely simple. Generally speaking, they allow to compact problematic product mixtures in rotary presses, which has been impossible up to date.

BRIEF DESCRIPTION OF THE SEVERAL VIEWS OF THE DRAWINGS

An embodiment of the invention will be described in more detail below with reference to the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In FIG. 1, a rotor 10 of a rotary press is outlined in which dies 12 for the reception of material to be compacted in a die-plate are disposed on an index circle. The material to be compacted is filled in by a filling device 14 which will not be described in greater detail. The filling device makes it possible to charge the dies with one type or several layers of material. The rotor 10 has associated therewith upper and lower rams which are not shown in FIG. 1. They are controlled in their height level by means of appropriate control cams during the rotation of the rotor 10 which is driven to rotate about a vertical axis via a suitable driving device. Two pressing rollers, one of which is illustrated at 18, are superimposed in a first compression station. The pressing rollers urge the lower and upper rams into the dies 12 in order to press the material together. A second compression station 20 also presents two superimposed pressing rollers, one of which can be recognized at 22. The compression station 20 completely compacts the material in the dies 12. Such a construction and such a function of a rotary press are generally known.

Figure 1:
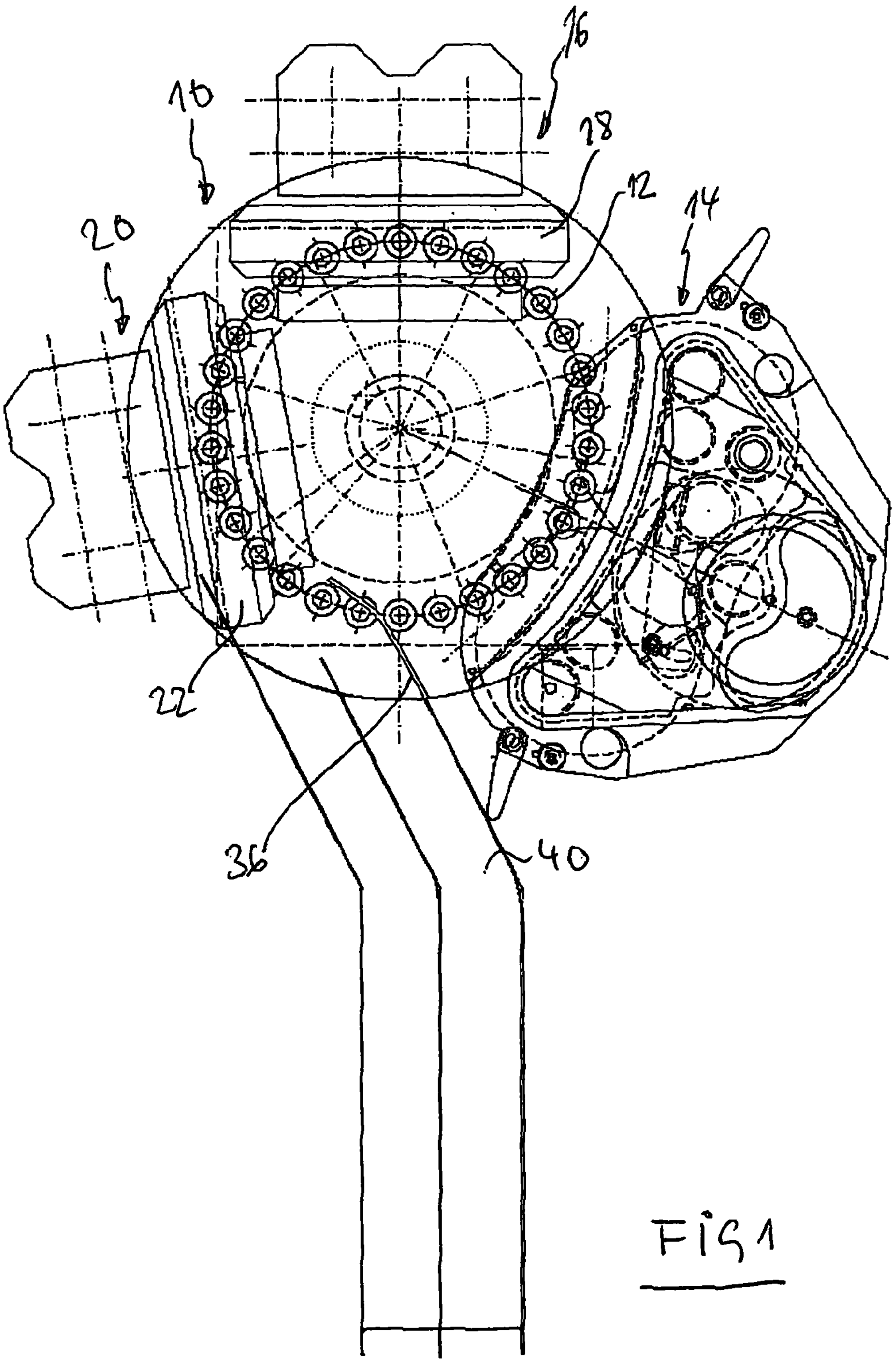
FIG. 1 shows a plan view of a rotor of a rotary press according to the invention.
Figure 2:
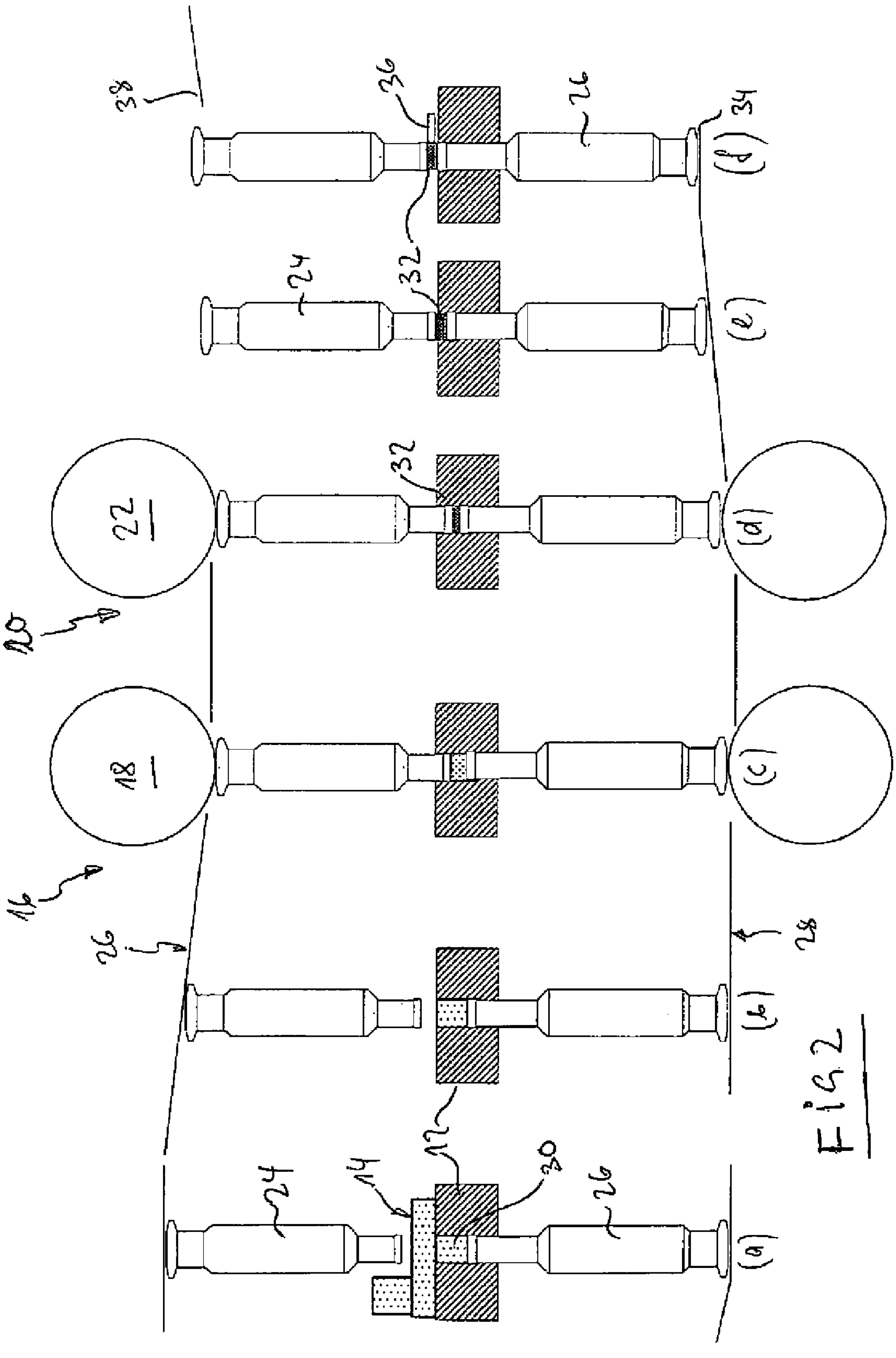
FIG. 2 shows some part of the sequence of processes in a rotary press on a pair of rams.

The sequence described is diagrammatically shown in a developed view in FIG. 2. The representation is made with reference to a pair of rams including an upper ram 24 and a lower ram 26. The dies 12 are outlined by a hatched-line area. The control cam for the upper rams 24 is shown very schematically at 26*a*. The control cam for the lower rams 26 is shown very schematically at 28. In the charging position, the upper and lower rams 24, 26 are in a position which is farthest from each other with the lower ram 26 having taken its filling position. Material 30 requiring to be compacted is outlined as dotted areas. When the rotor continues to rotate the upper ram 24 will first be lowered (2*b*). The material undergoes compression to form a compact blank in the first compression station 16. The material will then be deformed into a finished compact 32 in the subsequent compression station 20. The lower ram 26 is lifted by the control cam in the second compression station 20, which causes the compact 32 to be ejected from the die 12. The second control cam 26 can be seen to have a gap behind the second compression station 20. While the lower ram is being moved up the upper ram remains standing on top of the compact 32 and is lifted along. The lower ram 26 arrives at a control cam portion 34 which runs horizontally, by which fact the compact 32 remains lifted only up to a minimum above the upper side of the die-plate 12. At this stage, the compact 32 will approach the stationary stripper 36 which pushes the compact 32 out between the opposed pressing surfaces of the upper and lower rams. The thickness of the stripper sheet 36 is smaller than is the thickness of the compact 32 and the stripper engages the compact at a roughly central point. After the stripper 36 has pushed out the compact 32 by a certain distance between the pressing surfaces of the upper and lower rams the upper ram 24 is seized and lifted by a control cam portion 38, which makes the stripper 36 push the compact finally onto the upper side of the die-plate, from which it will then get into a discharge chute 40 (FIG. 1).

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for operating a rotary press, comprising a rotor rotatably driven about a vertical axis that has a die-plate and upper and lower rams which, while being guided vertically in guides of the rotor, interact with holes of dies in the die-plate, wherein at least one compression station is provided and has an upper and a lower pressing roller past which the presser rams run along and by which they are moved towards the die-bore for the purpose of compacting the material in the die-hole wherein the upper and lower rams are lifted subsequent to the compression procedure, causing the lower ram to eject a compact from the die and the compact to be stripped by a stripper in the direction of a discharge chute, characterized in that while a compact ejection procedure is under way the upper ram stands upright on top of the compact, by its own weight, and the upper ram and compact are lifted together and the stripper engages the compact laterally while the upper ram is still standing upright on top of the compact, by its own weight.

2. The method according to claim 1, characterized in that the stripper, while stripping the compact off relative to the rotor, passes through a distance of at least 0.5 mm before the upper ram is lifted.

3. A method for operating a rotary press, comprising the steps of:

providing a rotor rotatably driven about a vertical axis that has a die-plate and upper and lower rams which, while being guided vertically in guides of the rotor, interact with holes of dies in the die-plate, wherein at least one compression station is provided and has an upper and a lower pressing roller past which the presser rams run along and by which they are moved towards the die-bore for the purpose of compacting the material in the die-hole wherein the upper and lower rams are lifted subsequent to the compression procedure, causing the lower ram to eject a compact from the die and the compact to be stripped by a stripper in the direction of a discharge chute;

during a compact ejection procedure, the upper ram stands upright on top of the compact, by its own weight, the upper ram and compact are lifted together, and engaging the compact laterally with the stripper while the upper ram is still standing upright on top of the compact, by its own weight.

* * * * *